US012503015B2

(12) United States Patent
Ito

(10) Patent No.: US 12,503,015 B2
(45) Date of Patent: Dec. 23, 2025

(54) SEAT ROTATING DEVICE

(71) Applicant: TOYOTA BOSHOKU KABUSHIKI KAISHA, Aichi-ken (JP)

(72) Inventor: Sadao Ito, Anjo (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 169 days.

(21) Appl. No.: 18/514,001

(22) Filed: Nov. 20, 2023

(65) Prior Publication Data
US 2024/0166093 A1 May 23, 2024

(30) Foreign Application Priority Data
Nov. 21, 2022 (JP) .................................. 2022-185804

(51) Int. Cl.
*B60N 2/14* (2006.01)
(52) U.S. Cl.
CPC ....................................... *B60N 2/14* (2013.01)
(58) Field of Classification Search
CPC ........................................................ B60N 2/14
USPC .................................................... 297/344.24
See application file for complete search history.

(56) References Cited

U.S. PATENT DOCUMENTS

| 4,846,529 | A | * | 7/1989 | Tulley | ................ | B60N 2/02246 |
| | | | | | | 297/344.23 X |
| 5,524,952 | A | * | 6/1996 | Czech | .................... | B60N 2/245 |
| | | | | | | 297/344.24 X |
| 6,557,919 | B2 | * | 5/2003 | Suga | ...................... | B60N 2/146 |
| | | | | | | 297/344.21 |
| 6,572,172 | B1 | * | 6/2003 | Ninomiya | ............... | B60N 2/14 |
| | | | | | | 297/344.23 |
| 8,827,367 | B2 | * | 9/2014 | Hibi | ......................... | B60N 2/12 |
| | | | | | | 297/344.23 |
| 9,016,797 | B2 | * | 4/2015 | Iida | ....................... | B60N 2/0745 |
| | | | | | | 297/344.24 |
| 9,242,581 | B2 | * | 1/2016 | Farooq | ................. | B60N 2/0722 |
| 10,259,354 | B2 | * | 4/2019 | Lemay | ................. | B60N 2/0806 |
| 10,549,654 | B2 | * | 2/2020 | Duhamel | ........... | B60N 2/02246 |
| 11,370,333 | B2 | * | 6/2022 | Lemay | ............... | B60N 2/02246 |
| 12,065,061 | B2 | * | 8/2024 | Lemay | ................... | B60N 2/146 |
| 2007/0222267 | A1 | * | 9/2007 | Tsujimoto | ............. | F16H 37/126 |
| | | | | | | 297/344.24 |

(Continued)

FOREIGN PATENT DOCUMENTS

JP 2020-147186 A 9/2020

*Primary Examiner* — Rodney B White
(74) *Attorney, Agent, or Firm* — Greenblum & Bernstein, P.L.C.

(57) ABSTRACT

This seat rotating device is a seat rotating device that rotates a seat body between a seating position where the seat body faces front of a vehicle and a getting-on and -off position where the seat body faces an opening of a door of the vehicle. The seat rotating device includes a base plate fixed to a floor side of the vehicle, a turn frame arranged above the base plate and fixed to a lower surface of the seat body so as not to rotate relatively to the seat body, and a coupling unit that couples the base plate and the turn frame to each other such that the turn frame is rotatable with respect to the base plate between the seating position and the getting-on and -off position. The coupling unit includes a turn link and a drive mechanism fixed to a lower surface side of the turn link.

4 Claims, 11 Drawing Sheets

(56) References Cited

U.S. PATENT DOCUMENTS

2009/0284061 A1\* 11/2009 Maier ..................... B60N 2/14
297/344.24

\* cited by examiner

SEAT ROTATING DEVICE

CROSS REFERENCE TO RELATED APPLICATIONS

This nonprovisional application is based on Japanese Patent Application No. 2022-185804 filed with the Japan Patent Office on Nov. 21, 2022, the entire contents of which are hereby incorporated by reference.

BACKGROUND OF THE INVENTION

Field of the Invention

This invention relates to a seat rotating device.

Description of the Background Art

A seat rotating device capable of rotating a seat body between a seating position and a getting-on and -off position has conventionally been known. For example, Japanese Patent Laying-Open No. 2020-147186 discloses a seat rotating device including a base plate, a turn frame, and a drive unit (coupling unit).

The base plate is fixed on a floor side of a vehicle. The turn frame is fixed to a lower surface of the seat body. The drive unit couples the base plate and the turn frame to each other such that the turn frame is rotatable with respect to the base plate between the seating position and the getting-on and -off position.

SUMMARY OF THE INVENTION

In Japanese Patent Laying-Open No. 2020-147186, the drive unit is arranged in a portion above and in the rear of the turn frame (a portion below and in the rear of a seat cushion). When the drive unit is arranged in the portion above and in the rear of the turn frame, a hump caused by arrangement of the drive unit increases a size in an upward-downward direction of the seat rotating device. Consequently, when an occupant takes a seat, the hip portion of the occupant abuts on the drive unit, which may cause uncomfortable feeling of the occupant. When the seat cushion is moved upward, the seating position of the occupant is lifted upward and a feeling of a foreign body felt by the occupant can be eliminated. The seat cushion, however, should be moved upward.

The present invention provides a seat rotating device constructed to allow reduction in size thereof.

A seat rotating device according to one aspect of this invention is a seat rotating device that rotates a seat body between a seating position where the seat body faces front of a vehicle and a getting-on and -off position where the seat body faces an opening of a door of the vehicle. The seat rotating device includes a base plate fixed on a floor side of the vehicle, a turn frame arranged above the base plate and fixed to a lower surface of the seat body so as not to rotate relatively to the seat body, and a coupling unit that couples the base plate and the turn frame to each other such that the turn frame is rotatable with respect to the base plate between the seating position and the getting-on and -off position. The coupling unit includes a turn link including a fixed support portion and a movable support portion, the fixed support portion coupling the base plate and the turn frame to each other, the fixed support portion being rotatably fixed to the base plate as being rotatable relatively to the base plate on one end side, the movable support portion being pivotable with respect to the base plate around the fixed support portion on the other end side, the movable support portion being fixed to the turn frame as being rotatable relatively to the turn frame, a turn link guide rail fixed to the base plate, the turn link guide rail being in a shape extending in a front-rear direction, a turn link support slider movable along the turn link guide rail, the turn link support slider supporting the turn link, a first guide rail fixed to the base plate, the first guide rail being arranged at a prescribed distance in a lateral direction from the turn link guide rail, the first guide rail being in a shape linearly extending in the front-rear direction, a first support slider movable along the first guide rail, the first support slider supporting a first moving support portion provided in the turn frame, a second guide rail fixed to the base plate, the second guide rail being in a shape linearly extending as gradually coming closer to the turn link guide rail from the rear toward the front between the turn link guide rail and the first guide rail, a second support slider movable along the second guide rail, the second support slider supporting a second moving support portion provided in the turn frame, a pivot plate pivotably provided in the movable support portion of the turn link, and a drive mechanism fixed to a lower surface side of the turn link so as to rotate the pivot plate around the movable support portion.

When the seat body is moved from the seating position to the getting-on and -off position, the drive mechanism rotates the pivot plate clockwise around the movable support portion in a plan view, so that, in correspondence with force resulting from rotation of the pivot plate around the movable support portion, the turn frame fixed to the pivot plate starts pivoting around the fixed support portion, and in addition, the turn link support slider moves along the turn link guide rail, the first support slider moves along the first guide rail, and the second support slider moves along the second guide rail, and thus the turn frame is rotated toward the turn link guide rail while the turn frame is moved forward, and the seat body is moved from the seating position to the getting-on and -off position. When the seat body is moved from the getting-on and -off position to the seating position, the drive mechanism is rotated counterclockwise in the plan view so that the seat body is moved from the getting-on and -off position to the seating position through operations reverse to the above.

The foregoing and other objects, characteristics, aspects, and advantages of the present invention will become more apparent from the following detailed description of the present invention when taken in conjunction with the accompanying drawings.

DESCRIPTION OF THE PREFERRED EMBODIMENTS

Figure 1:
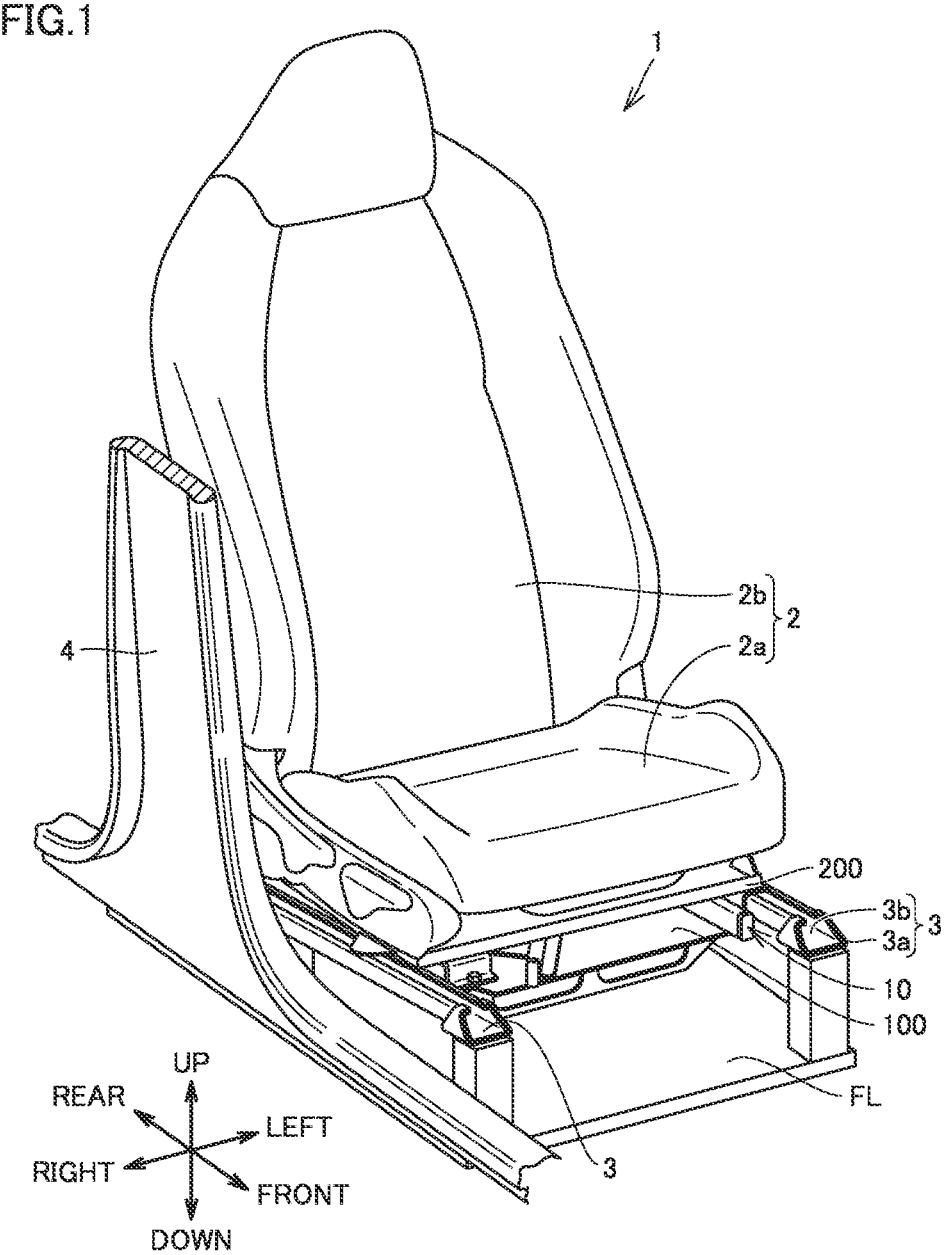
FIG. 1 is a perspective view of a rotary seat at a seating position.

A rotary seat and a seat rotating device in each embodiment will be described below with reference to the drawings. When the number or an amount is mentioned in an embodiment described below, the scope of the present invention is not necessarily limited to the number or the amount unless otherwise specified. Identical or corresponding elements have identical reference numerals allotted and redundant description may not be repeated. Use of features in the embodiment as combined as appropriate is originally intended.

A rotary seat shown below functions as a vehicle seat, in particular, as a car seat. "Front" shown in the drawings means a side of forward travel of a vehicle on which the rotary seat in the embodiment is mounted, "rear" means a side of rearward travel of the vehicle, "left" means a left hand side when viewed in a forward travel direction, "right" means a right hand side when viewed in the forward travel direction, "up" means an upper side of the vehicle, and "down" means a lower side of the vehicle, which is also similarly applicable in the drawings below.

Though the rotary seat shown below is illustrated with a seat located on the right with respect to a direction of travel of a vehicle being assumed, in a case of a seat located on the left with respect to the direction of travel of the vehicle, features shown below are arranged in symmetrical relation.

First Embodiment: Rotary Seat 1

A schematic construction of a rotary seat 1 in a first embodiment will be described with reference to FIGS. 1 and 2. FIG. 1 is a perspective view of a rotary seat at a seating position and FIG. 2 is a perspective view of the rotary seat at a getting-on and -off position.

Figure 2:
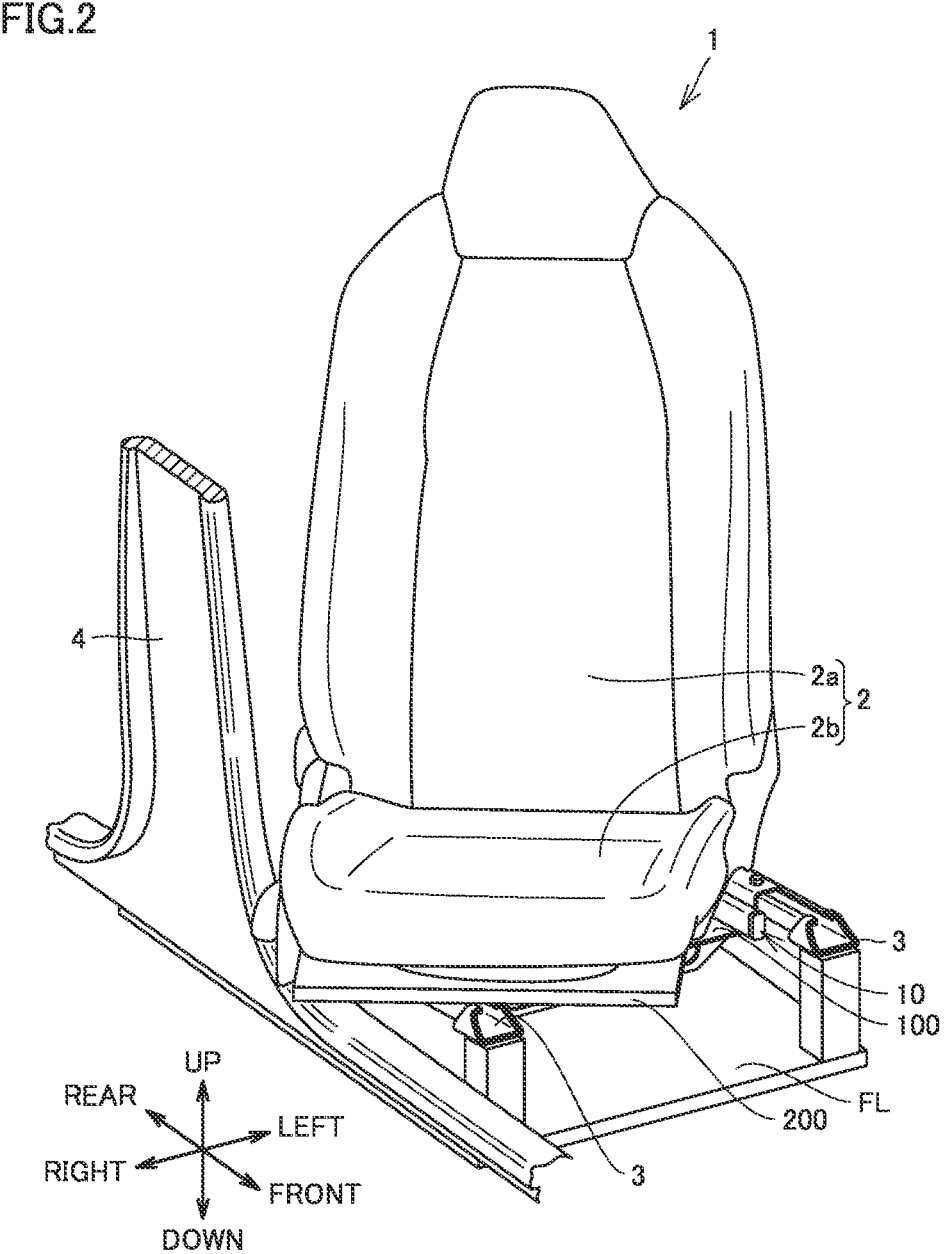
FIG. 2 is a perspective view of the rotary seat at a getting-on and -off position.

As shown in FIGS. 1 and 2, rotary seat 1 includes a seat body 2 and a seat rotating device 10. Seat body 2 includes a seat cushion 2a and a seat back 2b. Seat cushion 2a constitutes a seat that supports the hip portion of an occupant. Seat back 2b supports the back of an occupant seated on seat cushion 2a. Seat body 2 is disposed on a floor FL of a vehicle.

A pair of seat sliders 3 that slides seat body 2 in a front-rear direction of the vehicle with respect to floor FL is attached to floor FL. Seat sliders 3 are arranged at a distance from each other in a width direction (a lateral direction) of the vehicle. Each seat slider 3 includes a lower rail 3a and an upper rail 3b.

Lower rail 3a is fixed to floor FL in a posture in parallel to the front-rear direction of the vehicle. Upper rail 3b is displaceable relatively to lower rail 3a in the front-rear direction of the vehicle (the longitudinal direction of lower rail 3a).

Seat rotating device 10 can rotate seat body 2 between the seating position (the position shown in FIG. 1) and the getting-on and -off position (the position shown in FIG. 2). The seating position refers to a position where seat body 2 faces the front of the vehicle. The getting-on and -off position refers to a position where seat body 2 faces an opening of a door of the vehicle (toward a pillar 4 in FIGS. 1 and 2). Seat rotating device 10 is fixed to the lower surface of seat body 2.

(Seat Rotating Device 10)

Figure 3:
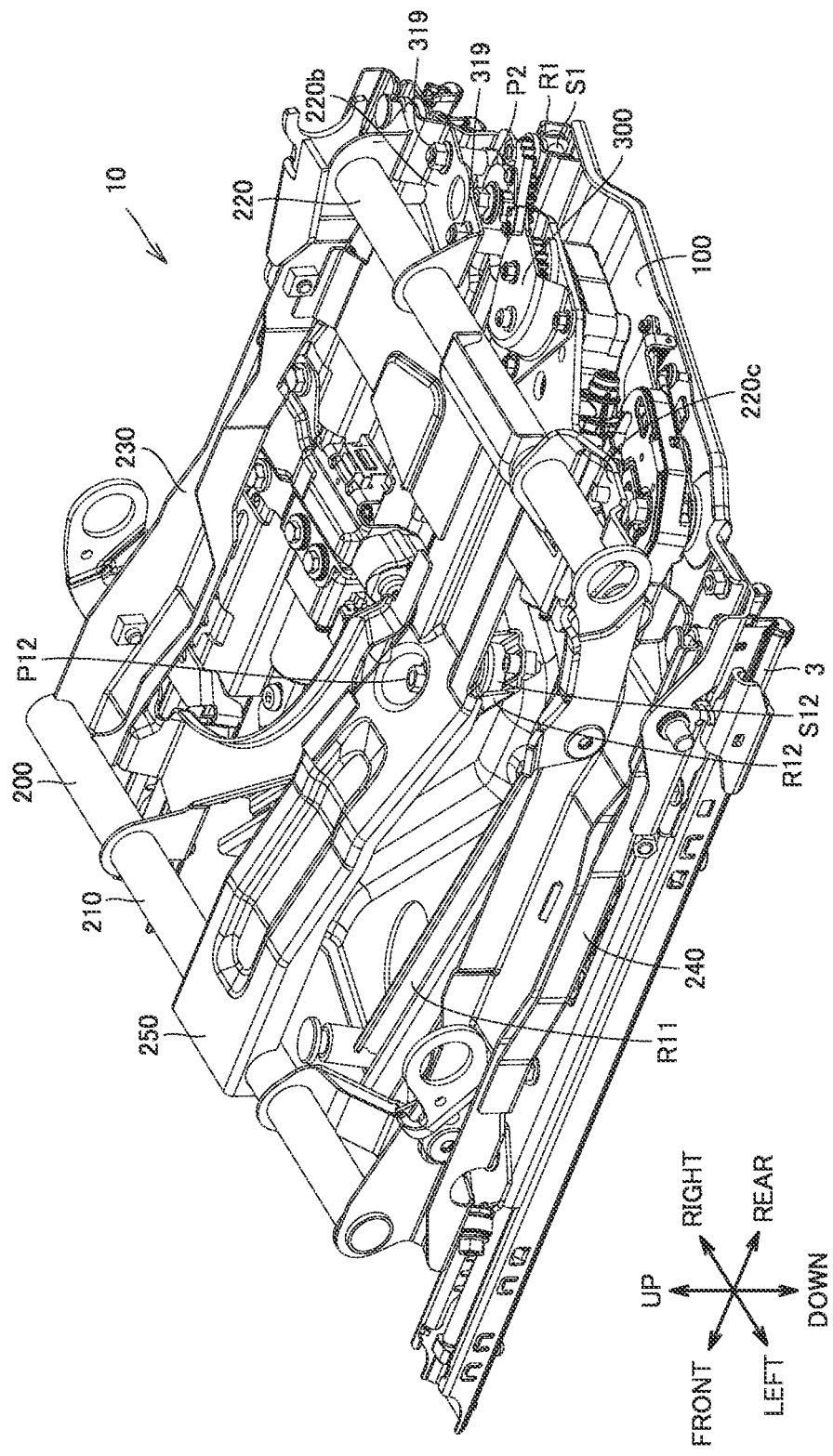
FIG. 3 is a perspective view of a seat rotating device at the seating position in a first embodiment.

A construction of seat rotating device 10 will now be described with reference to FIGS. 3 to 6. FIG. 3 is a perspective view of seat rotating device 10 at the seating position, FIG. 4 is a perspective view of the seat rotating device at the getting-on and -off position, FIG. 5 is an exploded perspective view of seat rotating device 10, and FIG. 6 is an exploded perspective view of a drive unit.

Figure 4:
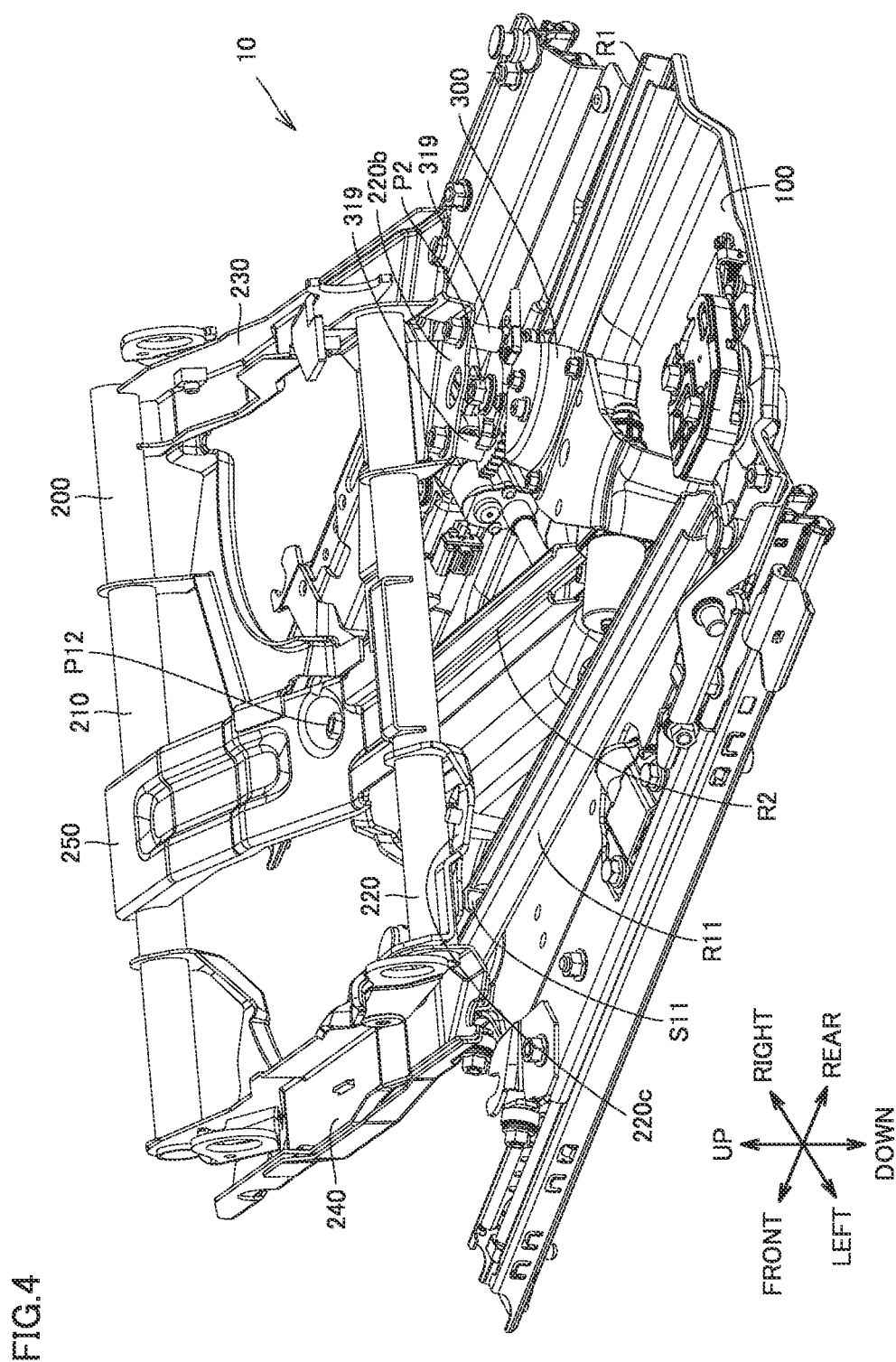
FIG. 4 is a perspective view of the seat rotating device at the getting-on and -off position in the first embodiment.
Figure 5:
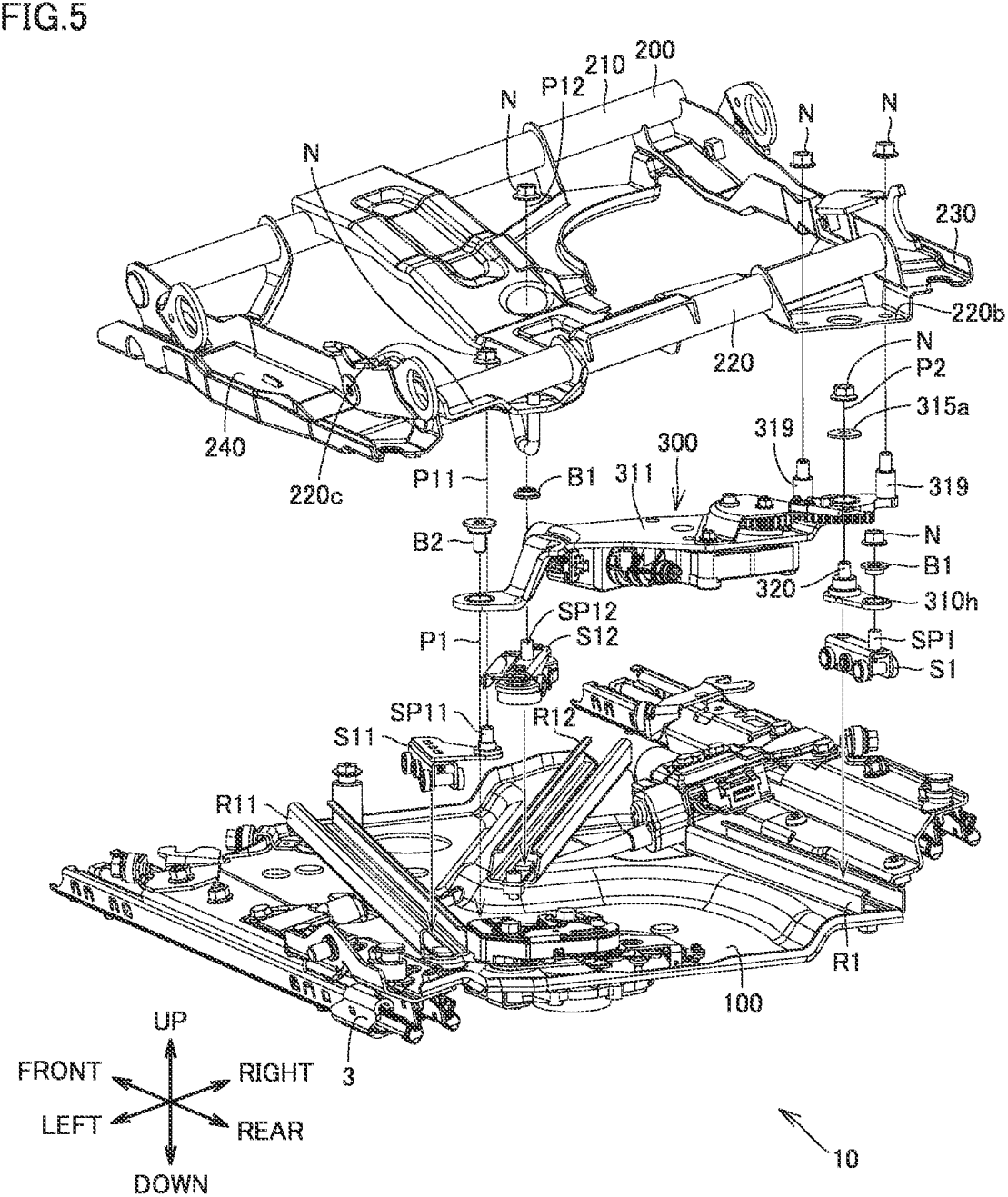
FIG. 5 is an exploded perspective view of the seat rotating device at the seating position in the first embodiment.
Figure 6:
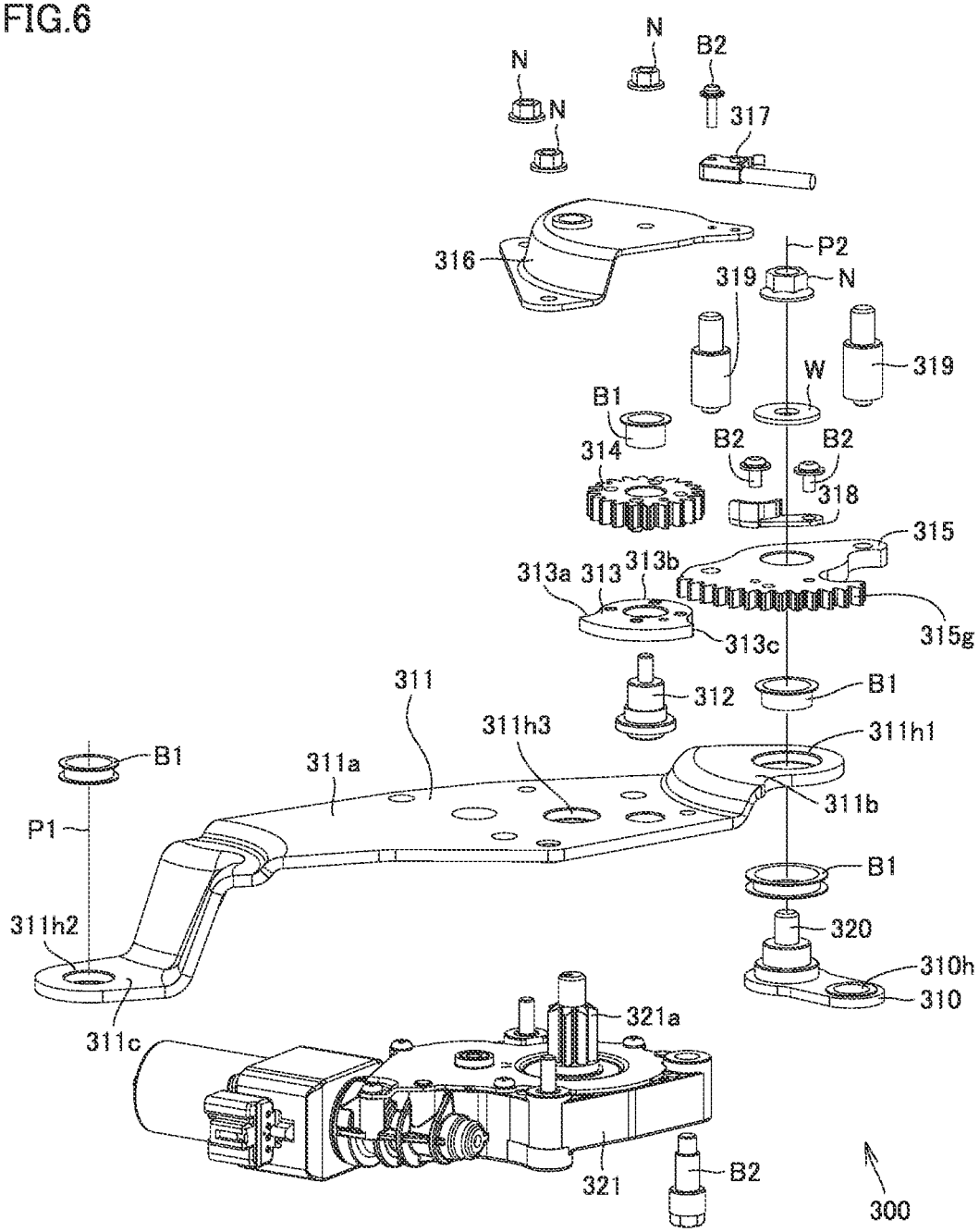
FIG. 6 is an exploded perspective view of a drive unit in the first embodiment.

As shown in FIGS. 3 to 5, seat rotating device 10 includes a base plate 100 fixed on a floor side of the vehicle, a turn frame 200 arranged above base plate 100 and fixed to a lower surface of seat body 2 so as not to rotate relatively to seat body 2, and a coupling unit 300 that couples base plate 100 and turn frame 200 to each other such that turn frame 200 is rotatable with respect to base plate 100 between the seating position and the getting-on and -off position.

Though detailed arrangement will be described later, a turn link guide rail R1, a first guide rail R11, and a second guide rail R12 are fixed onto base plate 100 press-formed into a prescribed shape. Turn link guide rail R1 is in a shape extending in the front-rear direction substantially on the right on base plate 100. In the present embodiment, turn link guide rail R1 is in a shape extending in the front-rear direction. First guide rail R11 is arranged at a prescribed distance in the left direction from turn link guide rail R1 and is in a shape linearly extending in the front-rear direction. Second guide rail R12 is in a shape linearly extending as gradually coming closer to turn link guide rail R1 from the rear toward the front between turn link guide rail R1 and first guide rail R11.

As shown in FIG. 5, turn link guide rail R1 guides movement of a turn link support slider S1. First guide rail R11 guides movement of a first support slider S11. Second guide rail R12 guides movement of a second support slider S12.

Turn frame 200 includes a front frame 210, a rear frame 220, a right frame 230, a left frame, and a central frame 250 that couples front frame 210 and rear frame 220 to each other. Though turn frame 200 is in a frame shape in the present embodiment, the turn frame is not limited to this form, and turn frame 200 may be formed from a plate or the like.

A turn link fixing bracket 220b for fixing turn link 311 is provided on the right of rear frame 220. A first moving support portion bracket 220c provided with a first moving support portion P11 is provided on the left of rear frame 220. A second moving support portion P12 is provided in a central area of central frame 250.

As shown in FIG. 5, a support pin SP11 is provided in first support slider S11 guided by first guide rail R11. Support pin SP11 is pivotably fixed to first moving support portion bracket 220c by a nut N. A support pin SP12 is provided in second support slider S12 guided by second guide rail R12. Support pin SP12 is pivotably fixed by a bush B1 and nut N to second moving support portion P12 provided in the central area of central frame 250.

(Coupling Unit 300)

Details of coupling unit 300 will be described with reference to FIGS. 4 to 6. Coupling unit 300 includes turn link guide rail R1, turn link support slider S1, first guide rail R11, first support slider S11, second guide rail R12, and second support slider S12 described above and further includes turn link 311 and a drive mechanism 321.

As shown in FIGS. 4 and 5, turn link 311 includes a fixed support portion P1 and a movable support portion P2, fixed support portion P1 coupling base plate 100 and turn frame 200 to each other, fixed support portion P1 being rotatably fixed to base plate 100 as being rotatable relatively to base plate 100 on one end side (left side), movable support portion P2 being pivotable with respect to base plate 100 around fixed support portion P1 on the other end side (right side), movable support portion P2 being fixed to turn frame 200 as being rotatable relatively to turn frame 200.

Referring to FIG. 6, turn link 311 includes a plate portion 311a located on a side of turn frame 200 (upper side), a bracket portion 311b that extends from plate portion 311a on one end side of plate portion 311a, and an attachment portion 311c extending downward toward base plate 100 on the other end side of plate portion 311a.

Attachment portion 311c of turn link 311 is provided with a through hole 311h2 to which bush B1 is fixed by swaging. Attachment portion 311c of turn link 311 is pivotably fixed to base plate 100 by a bolt B2 (see FIG. 5), with the use of this through hole 311h2. This position where turn link 311 is fixed to base plate 100 defines fixed support portion P1.

Bracket portion 311b of turn link 311 is provided with a through hole 311h1 to which bush B1 is fixed by swaging. A sector gear plate shaft 320 is pivotably inserted into through hole 311h1 from below bracket portion 311b. Sector gear plate shaft 320 is supported by a slider link plate 310. Slider link plate 310 is provided with a through hole 310h at a position displaced from sector gear plate shaft 320. A central position of sector gear plate shaft 320 defines movable support portion P2.

Referring back to FIG. 5, a support pin SP1 provided in turn link support slider S1 guided by turn link guide rail R1 is fixed to through hole 310h by nut N with bush B1 being interposed.

Turn link support slider S1 linearly moves along turn link guide rail R1. Turn link 311, on the other hand, rotates around fixed support portion P1. At this time, since movable support portion P2 which is the central position of sector gear plate shaft 320 and support pin SP1 are arranged at positions displaced from each other owing to slider link plate 310, movable support portion P2 moves along a trace like an arc (see an arrow Y11 in FIG. 9).

Referring again to FIG. 6, on an upper side of bracket portion 311b, a sector gear plate 315 as a pivot plate is pivotably attached to sector gear plate shaft 320 with bush B1 being interposed. A rack gear 315g is provided at an end surface of sector gear plate 315. Sector gear plate 315 is fixed by a washer W and nut N to sector gear plate shaft 320.

On the upper surface of sector gear plate 315, two fixed pins 319 are firmly fixed by welding or the like, with movable support portion P2 which is the central position of sector gear plate shaft 320 lying therebetween. This fixed pin 319 functions as a turn frame attachment bolt. A switch cam 318 for detection of a rotation position of sector gear plate 315 is fixed in the vicinity of rack gear 315g on the upper surface of sector gear plate 315, with the use of bolt B2.

On a lower surface side of plate portion 311a, on the other hand, drive mechanism 321 is attached with the use of bolt B2. Drive mechanism 321 is provided with a pinion gear 321a that protrudes upward. Pinion gear 321a protrudes upward through a through hole 311h3 provided in plate portion 311a.

An intermediate gear shaft 312 is fixed on an upper surface side of plate portion 311a by welding. A stopper plate 313 in a sector shape and an intermediate gear 314 as an idle gear are pivotally supported on intermediate gear shaft 312 with bush B1 being interposed. Intermediate gear 314 and stopper plate 313 are integrated by mating of projections and recesses provided in both of them. Pinion gear 321a is meshed with intermediate gear 314 and intermediate gear 314 is meshed with sector gear plate 315 to implement a single reduction mechanism.

In the present embodiment, rotation of pinion gear 321a (a gear ratio of 7) is transmitted through gears to sector gear plate 315 (a gear ratio of 50) with intermediate gear 314 (a gear ratio of 20) being interposed. A reduction ratio i at this time is i=50/7. Though intermediate gear 314 is not involved with the reduction ratio but simply transmits rotation, it can appropriately maintain a distance between the center of pinion gear 321a and the center of sector gear plate 315 without increase in diameter of pinion gear 321a and sector gear plate 315. Furthermore, by providing intermediate gear 314, force applied to each part can be less than in an example where pinion gear 321a is directly meshed with sector gear plate 315.

Stopper plate 313 restricts an amount of rotation of turn link 311 by restricting an amount of rotation of sector gear plate 315. The seating position and the getting-on and -off position of seat body 2 are thus restricted. Details of restriction of the amount of rotation of turn link 311 will be described later.

On the upper surface side of plate portion 311a, a protective cover 316 that covers pinion gear 321a and intermediate gear 314 is fixed with the use of nut N or the like. A limit switch 317 is fixed to an upper surface of protective cover 316 with the use of bolt B2. Limit switch 317 and switch cam 318 function as a detection mechanism that detects a rotation position of sector gear plate 315.

(Restriction of Amount of Rotation of Turn Link 311)

Figure 7:
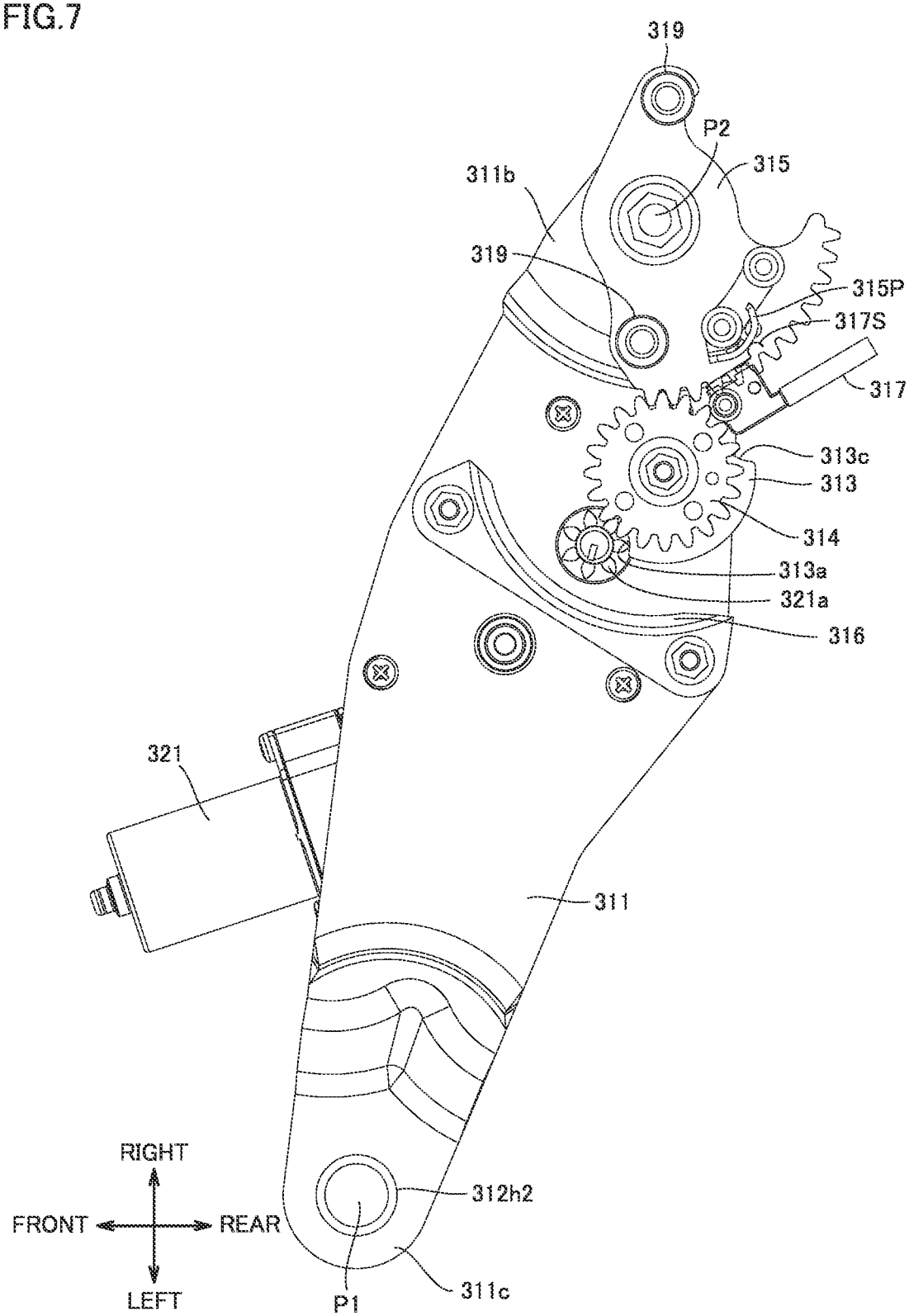
FIG. 7 is a diagram showing positional relation of a turn link at the seating position in the first embodiment.
Figure 8:
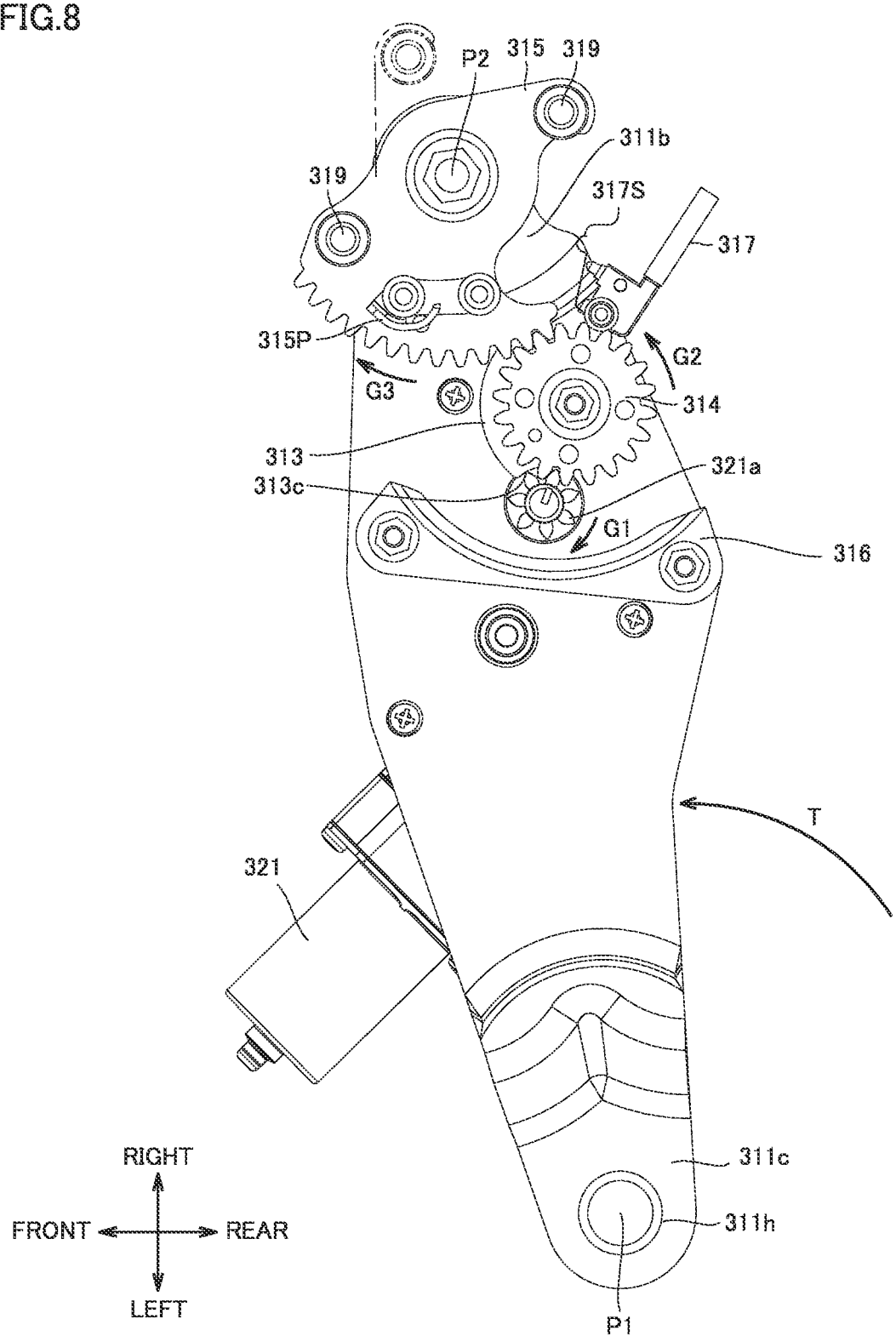
FIG. 8 is a diagram showing positional relation of the turn link at the getting-on and -off position in the first embodiment.

Restriction of the amount of rotation of turn link 311 will now be described in detail with reference to FIGS. 7 and 8. FIG. 7 is a diagram showing positional relation of turn link 311 at the seating position and FIG. 8 is a diagram showing positional relation of turn link 311 at the getting-on and -off position. For better understanding of an internal construction, FIGS. 7 and 8 do not show a part of protective cover 316 but show limit switch 317 fixed to protective cover 316.

Referring to FIG. 7, turn link 311 rotates around fixed support portion P1. The position of turn link 311 shown in FIG. 7 is a position in a state where rotary seat 1 is located at the seating position (the position shown in FIG. 1). In this state, switch cam 318 abuts on limit switch 317. In this state, switch cam 318 is in an ON state and hence the rotary seat being located at the seating position is detected. Stopper plate 313 in the sector shape has one first radial line portion 313a (see FIG. 6) directly abutting on pinion gear 321a to thereby restrict rotation of intermediate gear 314.

Referring to FIG. 8, when rotary seat 1 is rotated from the seating position to the getting-on and -off position, pinion gear 321a is rotated clockwise (in a direction shown with G1 in the figure) by drive mechanism 321. Intermediate gear 314 is thus rotated counterclockwise (a direction shown with G2 in the figure) and sector gear plate 315 is rotated clockwise (a direction shown with G3 in the figure). When turn link 311 starts rotation (a direction shown with an arrow T in the figure), switch cam 318 moves away from limit switch 317. In this state, switch cam 318 is in an OFF state and start of rotation of rotary seat 1 is detected. Stopper plate 313 in the sector shape is rotated together with intermediate gear 314. Since an arc portion 313b of stopper plate 313 does not abut on pinion gear 321a, it does not restrict rotation of intermediate gear 314.

When turn link 311 rotates to the getting-on and -off position, drive mechanism 321 stops rotating pinion gear 321a. At this time, stopper plate 313 in the sector shape has the other second radial line portion 313c (see FIG. 6) directly abutting on pinion gear 321a to thereby restrict rotation of intermediate gear 314.

(Rotational Operation of Turn Frame 200)

Figure 9:
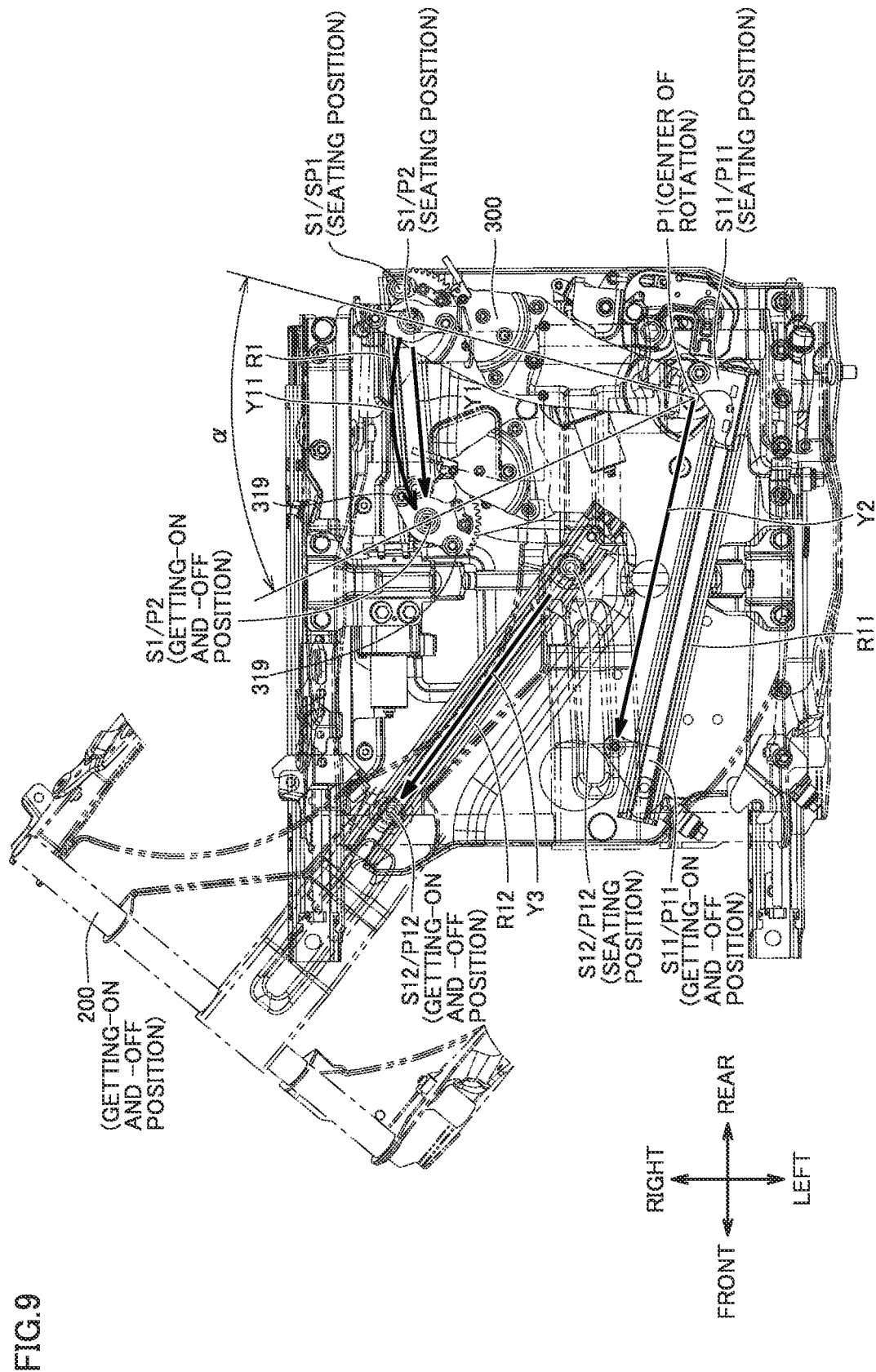
FIG. 9 is a diagram showing a trace of movement of a turn frame in the first embodiment.

A rotational operation of turn frame 200 in accordance with a rotational operation of turn link 311 described above will now be described with reference to FIG. 9. FIG. 9 is a diagram showing a trace of movement of turn frame 200.

Turn link 311 rotates around fixed support portion Pt. Movable support portion P2 of turn link 311 is supported by turn link support slider S1 and moves along turn link guide rail R1. Though turn link support slider S1 linearly moves (an arrow Y1 in the figure) along turn link guide rail R1, movable support portion P2 moves along the trace like the arc (see arrow Y11 in FIG. 9) because it is supported at the displaced position owing to slider link plate 310. An angle by which movable support portion P2 is moved from the seating position to the getting-on and -off position is a degrees in the figure. This angle α of movement corresponds to an angle between one first radial line portion 313a and the other second radial line portion 313c of stopper plate 313 in the sector shape. This angle α of movement can be changed to a requested angle as appropriate.

Simultaneously with movement of turn link 311 from the seating position to the getting-on and -off position, two fixed pins 319 provided on the upper surface of sector gear plate 315 are moved clockwise (see an arrow G3 in FIG. 8) around movable support portion P2. Since fixed pins 319 are fixed to turn link fixing bracket 220b of turn frame 200, force with which turn frame 200 itself is rotated is applied to turn frame 200. A direction of application of this force is guided with the use of first support slider S11 guided by first guide rail R11 and second support slider S12 guided by second guide rail R12.

First support slider S11 supports turn frame 200 at the position of first moving support portion P11. Second support slider S12 supports turn frame 200 at the position of second moving support portion P12.

In movement of seat body 2 from the seating position to the getting-on and -off position based on this construction, drive mechanism 321 rotates sector gear plate 315 clockwise (a direction shown with arrow G3 in FIG. 8) around movable support portion P2 in the plan view, so that, in correspondence with force resulting from rotation of sector gear plate 315 around movable support portion P2, turn link 311 fixed to sector gear plate 315 starts pivoting around fixed support portion P1.

Simultaneously, turn link support slider S1 moves from the seating position to the getting-on and -off position along turn link guide rail R1. Simultaneously, first support slider S11 moves from the seating position to the getting-on and -off position along first guide rail R11. Simultaneously, second support slider S12 moves from the seating position to the getting-on and -off position along second guide rail R12. As a result of these operations, turn frame 200 is rotated toward turn link guide rail R1 (right side) while turn frame 200 is moved forward, and seat body 2 is moved from the seating position to the getting-on and -off position.

In movement of seat body 2 from the getting-on and -off position to the seating position, on the other hand, drive mechanism 321 rotates sector gear plate 315 counterclockwise (a direction opposite to arrow G3 in FIG. 8) around movable support portion P2 in the plan view, so that, in correspondence with force resulting from rotation of sector gear plate 315 around movable support portion P2, turn link 311 fixed to sector gear plate 315 starts pivoting around fixed support portion P1.

Operations reverse to the above are thus performed, so that turn link support slider S1 moves from the getting-on and -off position to the seating position along turn link guide rail R1. Simultaneously, first support slider S11 moves from the getting-on and -off position to the seating position along first guide rail R11. Simultaneously, second support slider S12 moves from the getting-on and -off position to the seating position along second guide rail R12. As a result of these operations, turn frame 200 is rotated toward turn link guide rail R1 (left side) while it is moved rearward, and seat body 2 is moved from the getting-on and -off position to the seating position.

When seat body 2 returns from the getting-on and -off position to the seating position, switch cam 318 abuts on limit switch 317 (ON state) and the seat body being located at the seating position is detected.

Turn link guide rail R1, first guide rail R11, and second guide rail R12 are preferably in such arrangement that turn link guide rail R1 is in the shape linearly extending in the front-rear direction substantially on the right side on base plate 100 and extends gradually toward the center in the forward direction as shown in FIG. 9 and that second guide rail R12 is arranged at a prescribed distance in the left direction from turn link guide rail R1, is in the shape linearly extending in the front-rear direction, and extends gradually toward the center in the forward direction.

Preferably, second guide rail R12 is in the shape linearly extending as gradually coming closer to turn link guide rail R1 from the rear toward the front between turn link guide rail R1 and first guide rail R11 and located on the right of turn link guide rail R1 at the getting-on and -off position of second support slider S12 of second guide rail R12.

More specifically, turn link guide rail R1, first guide rail R11, and second guide rail R12 are desirably arranged in line with the trace of support pin SP1 of turn link support slider S1, the trace of first moving support portion P11 of first support slider S11, and the trace of second moving support portion P12 of second support slider S12, with movement of turn frame 200.

(Functions and Effects of Embodiment)

Thus, according to the seat rotating device in the present embodiment, drive mechanism 321 is arranged in a gap between base plate 100 and the lower surface of plate portion 311a of turn link 311. Therefore, increase in thickness in the upward-downward direction and upward projection of drive mechanism 321 can be avoided, projection of coupling unit 300 rearward can be suppressed, and reduction in size of the seat rotating device can be achieved.

Since great force for rotating turn frame 200 is applied to turn link 311, turn link 311 is in a shape having a large thickness and a large width. Drive mechanism 321, pinion gear 321a, and sector gear plate 315 of coupling unit 300 can be assembled to this turn link 311 in an integrated manner. Since turn link 311 thus performs functions of both of strength and attachment of coupling unit 300, efficiency in arrangement of devices can be improved.

Furthermore, drive mechanism 321, pinion gear 321a, intermediate gear 314, and sector gear plate 315 of coupling unit 300 are assembled to turn link 311 in an integrated manner. According to this construction, unitization with the mesh of gears being dependent on machining accuracy can be achieved, ease in assembly can be improved, and precise assembly can be achieved. The mesh between gears can thus be stabilized, generation of noise during operations can be suppressed, and quietness can be improved.

Since unitized precision equipment can be assembled in advance to turn frame 200, assembly to base plate 100 and turn frame 200 can be facilitated.

Pinion gear 321a, intermediate gear 314, and sector gear plate 315 are arranged on the upper surface of turn link 311 and drive mechanism 321 is arranged on the lower surface of turn link 311, so that they are unitized. Thus, a distance between sector gear plate 315 and drive mechanism 321 can be maintained while an appropriate reduction ratio is ensured.

Stopper plate 313 is provided as being integrated with intermediate gear 314 and stopper plate 313 directly abuts on pinion gear 321a, to thereby restrict rotation of turn link 311. According to this construction, load applied in abutment is relatively low, and deformation of turn link 311 can be suppressed.

Sector gear plate 315 is provided with two fixed pins 319, with movable support portion P2 lying therebetween, and the two fixed pins are fixed to turn frame 200. Though great force for rotating turn frame 200 is generated in turn frame 200 and sector gear plate 315, fixed pins 319 arranged with movable support portion P2 lying therebetween can transmit rotational force to turn frame 200.

Intermediate gear 314 is provided between pinion gear 321a and rack gear 315g, stopper plate 313 is fixed to intermediate gear 314, stopper plate 313 is in the sector shape, and stopper plate 313 includes first radial line portion 313a that directly abuts on pinion gear 321a when seat body 2 is located at the seating position and second radial line portion 313c that directly abuts on pinion gear 321a when pinion gear 321a rotates and seat body 2 is located at the getting-on and -off position.

First radial line portion 313a and second radial line portion 313c provided in stopper plate 313 directly physically abut on pinion gear 321a, so that rotation of intermediate gear 314 and sector gear plate 315 provided with rack gear 315g can be restricted.

Second Embodiment: Seat Rotating Device 10A

Figure 10:
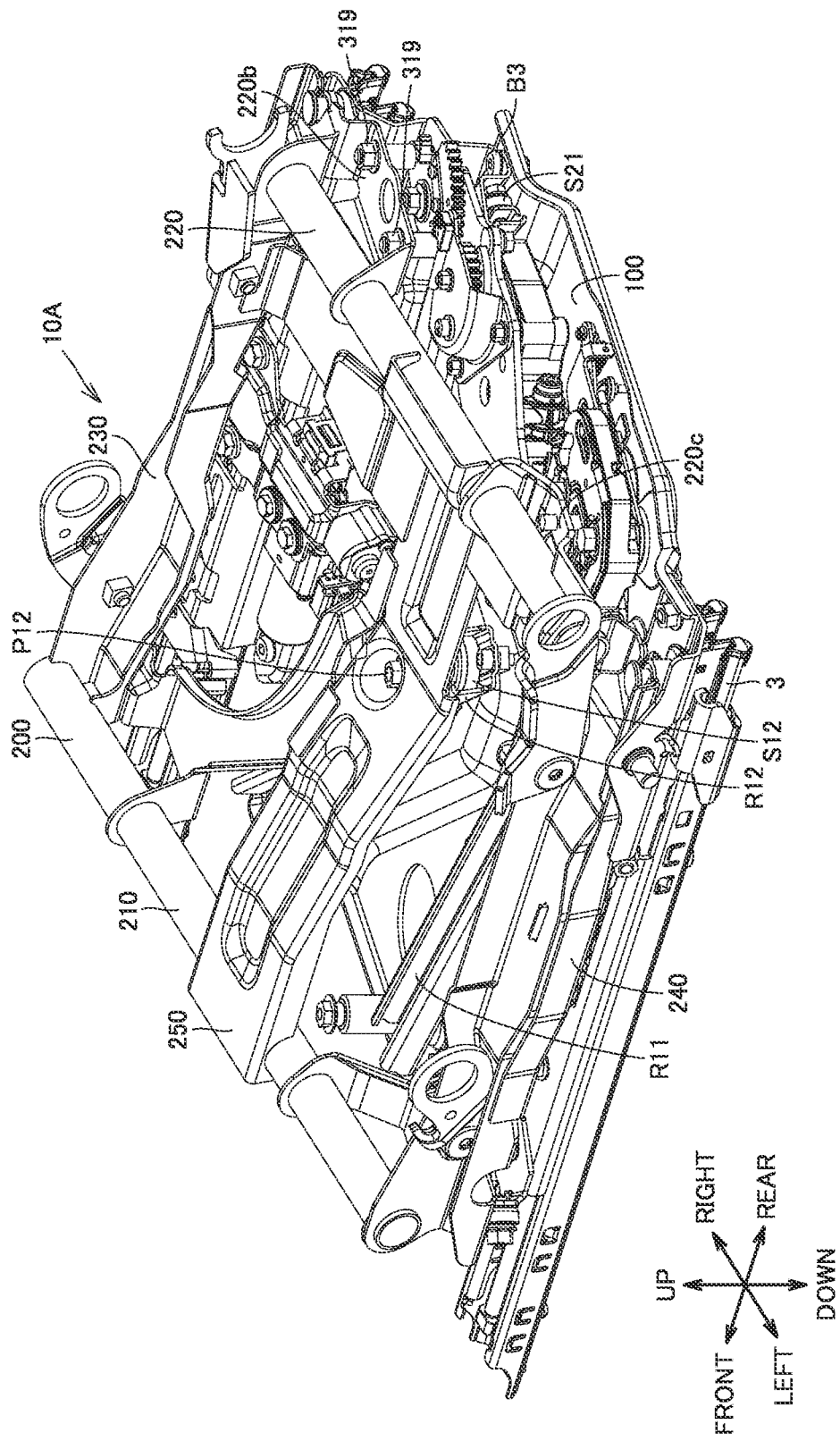
FIG. 10 is a perspective view of a seat rotating device at a seating position in a second embodiment.

A construction of a seat rotating device 10A which is a modification of seat rotating device 10 in the first embodiment will now be described with reference to FIGS. 10 and 11. This seat rotating device 10A is the same in basic construction as seat rotating device 10. Therefore, only differences will be described in the description below, and features in common have the same reference numerals allotted in the drawings and redundant description will not be repeated.

In the construction of seat rotating device 10 in the first embodiment, a structure in which slider link plate 310 couples turn link 311 and turn link support slider S1 to each other is adopted. According to this construction, turn link support slider S1 moves along linear turn link guide rail R1 (arrow Y1 in FIG. 9) and movable support portion P2 moves along the trace like the arc around fixed support portion P1 (see arrow Y11 in FIG. 9).

Figure 11:
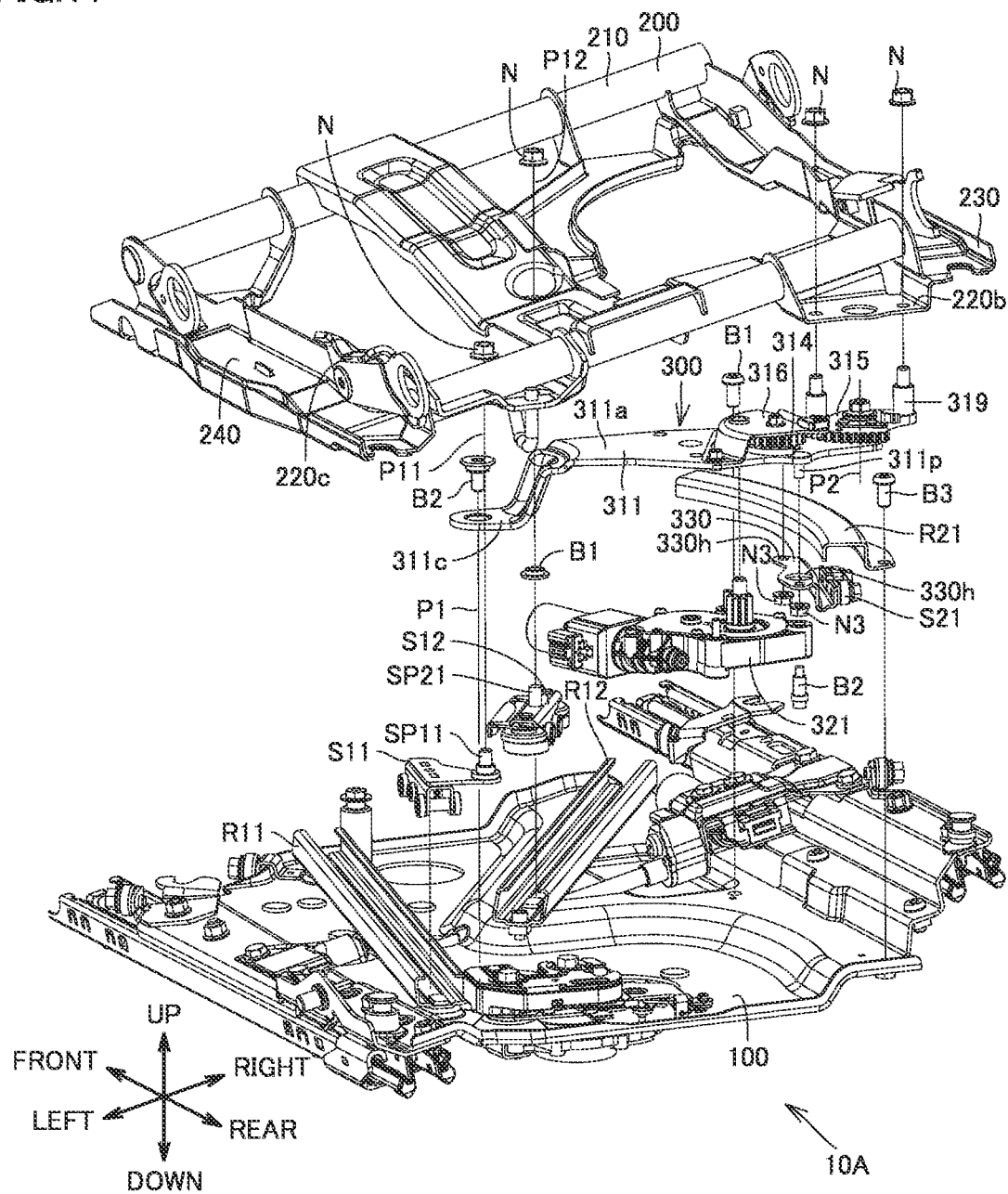
FIG. 11 is a perspective view of the seat rotating device at the getting-on and -off position in the second embodiment.

In the construction of seat rotating device 10A in the present second embodiment, on the other hand, as seen well in FIG. 11, a turn link support slider S21 is directly fixed to a support pin 311p provided in turn link 311. Sector gear plate shaft 320 which serves as the core of movable support portion P2 is directly provided on turn link 311.

In fixing turn link support slider S21 to turn link 311, support pin 311p is inserted through hole 330h provided in a guide plate 330 of turn link support slider S21 and a nut N3 is fastened to support pin 311p. According to this construction, a turn link guide rail R21 that guides turn link support slider S21 is in an arc shape along the trace in the arc shape of support pin 311p around fixed support portion P1.

The construction of seat rotating device 10A in this second embodiment can also achieve functions and effects similar to those of the seat rotating device in the first embodiment.

An illustrative embodiment described above is understood by a person skilled in the art as specific examples of aspects below.

(Aspect I)

This seat rotating device is a seat rotating device that rotates a seat body between a seating position where the seat body faces front of a vehicle and a getting-on and -off position where the seat body faces an opening of a door of the vehicle. The seat rotating device includes a base plate fixed on a floor side of the vehicle, a turn frame arranged above the base plate and fixed to a lower surface of the seat body so as not to rotate relatively to the seat body, and a coupling unit that couples the base plate and the turn frame to each other such that the turn frame is rotatable with respect to the base plate between the seating position and the getting-on and -off position. The coupling unit includes a turn link including a fixed support portion and a movable support portion, the fixed support portion coupling the base plate and the turn frame to each other, the fixed support portion being rotatably fixed to the base plate as being rotatable relatively to the base plate on one end side, the movable support portion being pivotable with respect to the base plate around the fixed support portion on the other end side, the movable support portion being fixed to the turn frame as being rotatable relatively to the turn frame, a turn link guide rail fixed to the base plate, the turn link guide rail being in a shape extending in a front-rear direction, a turn link support slider movable along the turn link guide rail, the turn link support slider supporting the turn link, a first guide rail fixed to the base plate, the first guide rail being arranged at a prescribed distance in a lateral direction from the turn link guide rail, the first guide rail being in a shape linearly extending in the front-rear direction, a first support slider movable along the first guide rail, the first support slider supporting a first moving support portion provided in the turn frame, a second guide rail fixed to the base plate, the second guide rail being in a shape linearly extending as gradually coming closer to the turn link guide rail from rear toward front between the turn link guide rail and the first guide rail, a second support slider movable along the second guide rail, the second support slider supporting a second moving support portion provided in the turn frame, a pivot plate pivotably provided in the movable support portion of the turn link, and a drive mechanism fixed to a lower surface side of the turn link so as to rotate the pivot plate around the movable support portion. When the seat body is moved from the seating position to the getting-on and -off position, the drive mechanism rotates the pivot plate clockwise around the movable support portion in a plan view, so that, in correspondence with force resulting from rotation of the pivot plate around the movable support portion, the turn frame fixed to the pivot plate starts pivoting around the fixed support portion, and in addition, the turn link support slider moves along the turn link guide rail, the first support slider moves along the first guide rail, and the second support slider moves along the second guide rail, and thus the turn frame is rotated toward the turn link guide rail while the turn frame is moved forward, and the seat body is moved from the seating position to the getting-on and -off position. When the seat body is moved from the getting-on and -off position to the seating position, the drive mechanism is rotated counterclockwise in the plan view so that the seat body is moved from the getting-on and -off position to the seating position through operations reverse to the above.

According to this seat rotating device, the drive mechanism is arranged in a gap provided between the base plate and the lower surface side of the turn link. Therefore, increase in thickness in the upward-downward direction and upward projection of the drive mechanism can be avoided, and reduction in size of the seat rotating device can be achieved.

(Aspect II)

In the seat rotating device described in Aspect I, the pivot plate has an end surface provided with a rack gear, the turn link includes a plate portion located on a side of the turn frame, and the drive mechanism is arranged on a lower surface of the plate portion on a side of the base plate, and rotation of the drive mechanism is transmitted as rotation of a pinion gear to the rack gear of the pivot plate arranged on an upper surface side of the plate portion.

According to this aspect, the turn link and the drive mechanism are arranged and rotation of the drive mechanism is transmitted as rotation of the pinion gear to the rack gear of the pivot plate arranged on the upper surface side of the plate portion. Therefore, unitization with the mesh of gears being dependent on machining accuracy can be achieved, ease in assembly can be improved, and precise assembly can be achieved. The mesh of gears can thus be stabilized, generation of noise during operations can be suppressed, and quietness can be improved.

(Aspect III)

In the seat rotating device described in Aspect II, an intermediate gear is provided between the pinion gear and the rack gear, a stopper plate is fixed to the intermediate gear, and the stopper plate is in a sector shape, and the stopper plate restricts rotation of the intermediate gear by including a first radial line portion and a second radial line portion, the first radial line portion directly abutting on the pinion gear when the seat body is located at the seating position, the second radial line portion directly abutting on the pinion gear when the pinion gear rotates and the seat body is located at the getting-on and -off position.

According to this aspect, the first radial line portion and the second radial line portion provided in the stopper plate directly physically abut on the pinion gear, so that rotation of the intermediate gear and the pivot plate provided with the rack gear can be restricted.

(Aspect IV)

In the seat rotating device described in any one of Aspects I to III, the pivot plate is provided with two fixed pins, with the movable support portion lying between the two fixed pins, and the two fixed pins are fixed to the turn frame.

According to this aspect, though great force for rotating the turn frame is generated, the fixed pins arranged with the movable support portion lying therebetween can transmit rotational force to the turn frame.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A seat rotating device that rotates a seat body between a seating position where the seat body faces front of a vehicle and a getting-on and -off position where the seat body faces an opening of a door of the vehicle, the seat rotating device comprising:
    a base plate fixed on a floor side of the vehicle;
    a turn frame arranged above the base plate and fixed to a lower surface of the seat body so as not to rotate relative to the seat body; and
    a coupling unit that couples the base plate and the turn frame to each other such that the turn frame is rotatable with respect to the base plate between the seating position and the getting-on and -off position, wherein
    the coupling unit includes
        a turn link including a fixed support portion and a movable support portion, the fixed support portion coupling the base plate and the turn frame to each other, the fixed support portion being rotatably fixed to the base plate as being rotatable relative to the base plate on a first end side, the movable support portion being pivotable with respect to the base plate around the fixed support portion on a second end side, the movable support portion being fixed to the turn frame as being rotatable relative to the turn frame,
        a turn link guide rail fixed to the base plate, the turn link guide rail being in a shape extending in a front-rear direction,
        a turn link support slider movable along the turn link guide rail, the turn link support slider supporting the turn link,
        a first guide rail fixed to the base plate, the first guide rail being arranged at a prescribed distance in a lateral direction from the turn link guide rail, the first guide rail being in a shape linearly extending in the front-rear direction,
        a first support slider movable along the first guide rail, the first support slider supporting a first moving support portion provided in the turn frame,
        a second guide rail fixed to the base plate, the second guide rail being in a shape linearly extending while gradually coming closer to the turn link guide rail from rear toward front between the turn link guide rail and the first guide rail,
        a second support slider movable along the second guide rail, the second support slider supporting a second moving support portion provided in the turn frame,
        a pivot plate pivotably provided in the movable support portion of the turn link, and
        a drive mechanism fixed to a lower surface side of the turn link so as to rotate the pivot plate around the movable support portion, and
    when the seat body is moved from the seating position to the getting-on and -off position, the drive mechanism rotates the pivot plate clockwise around the movable support portion in a plan view, so that, in correspondence with force resulting from rotation of the pivot plate around the movable support portion, the turn frame fixed to the pivot plate starts pivoting around the fixed support portion, and in addition, the turn link support slider moves along the turn link guide rail, the first support slider moves along the first guide rail, and the second support slider moves along the second guide rail, and thus the turn frame is rotated toward the turn link guide rail while the turn frame is moved forward, and the seat body is moved from the seating position to the getting-on and -off position, and when the seat body is moved from the getting-on and -off position to the seating position, the drive mechanism is rotated counterclockwise around a vertical axis so that the seat body is moved from the getting-on and -off position to the seating position.

2. The seat rotating device according to claim 1, wherein the pivot plate has an end surface provided with a rack gear, the turn link includes a plate portion located on a side of the turn frame, and the drive mechanism is arranged on a lower surface of the plate portion on a side of the base plate, and rotation of the drive mechanism is transmitted as rotation of a pinion gear to the rack gear of the pivot plate arranged on an upper surface side of the plate portion.

3. The seat rotating device according to claim 2, wherein an intermediate gear is provided between the pinion gear and the rack gear, a stopper plate is fixed to the intermediate gear, and the stopper plate is in a sector shape, and the stopper plate restricts rotation of the intermediate gear by including a first radial line portion and a second radial line portion, the first radial line portion directly abutting on the pinion gear when the seat body is located at the seating position, the second radial line portion directly abutting on the pinion gear when the pinion gear rotates and the seat body is located at the getting-on and -off position.

4. The seat rotating device according to claim 1, wherein the pivot plate is provided with two fixed pins, with the movable support portion lying between the two fixed pins, and the two fixed pins are fixed to the turn frame.

* * * * *